United States Patent
Jacquerie et al.

(10) Patent No.: US 10,688,421 B2
(45) Date of Patent: Jun. 23, 2020

(54) STRAINER FOR TURBINE ENGINE OIL

(71) Applicant: Safran Aero Boosters SA, Herstal (BE)

(72) Inventors: Jean-Louis Jacquerie, Antheit (BE); Tom Henkes, Eupen (BE); Laurent Tossens, Liège (BE); Nicolas Fellin, Marchin (BE); Mathieu Chenoux, Arlon (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 622 days.

(21) Appl. No.: 15/229,586

(22) Filed: Aug. 5, 2016

(65) Prior Publication Data
US 2017/0036144 A1 Feb. 9, 2017

(30) Foreign Application Priority Data
Aug. 6, 2015 (BE) .................................. 2015/5500

(51) Int. Cl.
*B01D 35/00* (2006.01)
*B01D 35/06* (2006.01)
(Continued)

(52) U.S. Cl.
CPC ........... *B01D 35/005* (2013.01); *B01D 29/13* (2013.01); *B01D 35/023* (2013.01); *B01D 35/06* (2013.01);
(Continued)

(58) Field of Classification Search
CPC ............ B01D 29/0004; B01D 29/0009; B01D 29/0095; B01D 29/0097; B01D 29/13;
(Continued)

(56) References Cited

U.S. PATENT DOCUMENTS

| | | | | | |
|---|---|---|---|---|---|
| 2,450,006 | A | * | 9/1948 | Lesniak | B01D 29/071 210/348 |
| 3,746,595 | A | * | 7/1973 | Leason | B01D 29/111 156/245 |

(Continued)

FOREIGN PATENT DOCUMENTS

| | | |
|---|---|---|
| JP | 2006102720 A | 4/2006 |
| WO | 2012120252 A1 | 9/2012 |

(Continued)

OTHER PUBLICATIONS

Search Report dated Apr. 6, 2016 for BE 201505500.

*Primary Examiner* — David C Mellon
(74) *Attorney, Agent, or Firm* — James E. Walton

(57) ABSTRACT

A strainer for filtration in an oil circuit of a turbine engine, in particular a multi-flow turbojet engine, is housed in a bore of a lubrication assembly. The oil serves to lubricate and cool mechanisms of the turbine engine. The strainer includes a filtering portion as an angular tube portion and a holding structure for the filtering portion. The structure forms a thickening and exhibits rings and structural posts. A magnet is added in a socket formed by the structure. The structure and the filtering portion are integral and are produced by additive manufacturing, which simplifies production. The application likewise relates to a method of producing the strainer.

9 Claims, 3 Drawing Sheets

US 10,688,421 B2
Page 2

(51) Int. Cl.
*F16L 55/24* (2006.01)
*B01D 29/13* (2006.01)
*B01D 35/02* (2006.01)
*F01D 25/20* (2006.01)
*F02C 7/06* (2006.01)

(52) U.S. Cl.
CPC ........... *F01D 25/20* (2013.01); *F02C 7/06* (2013.01); *F16L 55/24* (2013.01); *B01D 2201/04* (2013.01); *B01D 2201/184* (2013.01); *F05D 2220/323* (2013.01); *F05D 2260/98* (2013.01)

(58) Field of Classification Search
CPC ............ B01D 29/19; B01D 2201/04; B01D 2201/325; B01D 2201/60; B01D 35/34; B01D 35/308; B01D 35/023; B01D 29/071; B01D 29/035; B01D 29/014
See application file for complete search history.

(56) References Cited

U.S. PATENT DOCUMENTS

| | | | | |
|---|---|---|---|---|
| 4,026,805 | A * | 5/1977 | Fowler | B01D 35/06 209/223.1 |
| 4,036,758 | A | 7/1977 | Combest | |
| 4,063,608 | A * | 12/1977 | Sullivan | B60K 17/10 180/215 |
| 4,130,622 | A * | 12/1978 | Pawlak | B01D 29/111 264/255 |
| 4,204,960 | A * | 5/1980 | Sugiyama | B01D 29/111 210/232 |
| 4,340,470 | A * | 7/1982 | Van Mol | B01D 29/01 210/94 |
| 4,608,166 | A * | 8/1986 | Cain | B01D 29/111 210/232 |
| 4,882,055 | A * | 11/1989 | Stamstad | B01D 29/111 210/483 |
| 5,660,063 | A * | 8/1997 | Lee | D06F 39/10 68/18 F |
| 6,722,508 | B2 * | 4/2004 | Parker | B01D 29/111 210/448 |
| 6,849,179 | B1 * | 2/2005 | Taylor | B01D 35/027 184/6.24 |
| 7,243,512 | B2 * | 7/2007 | Kim | D06F 39/085 134/104.2 |
| 10,232,289 | B2 * | 3/2019 | Trotter | B01D 35/02 |
| 2008/0047888 | A1 | 2/2008 | Durocher et al. | |
| 2013/0334127 | A1 * | 12/2013 | Perz | B01D 29/014 210/447 |
| 2017/0216743 | A1 * | 8/2017 | Yamamoto | B01D 29/96 |
| 2018/0017298 | A1 * | 1/2018 | Dziubinschi | B01D 15/26 |

FOREIGN PATENT DOCUMENTS

| | | |
|---|---|---|
| WO | 2014149141 A1 | 9/2014 |
| WO | 2014174323 A1 | 10/2014 |

* cited by examiner

STRAINER FOR TURBINE ENGINE OIL

This application claims priority under 35 U.S.C. § 119 to Belgium Patent Application No. 2015/5500, filed 6 Aug. 2015, titled "Strainer for Turbine Engine Oil," which is incorporated herein by reference for all purposes.

BACKGROUND

1. Field of the Application

The present application relates to the field of strainers. More accurately, the present application relates to a turbine engine oil filtration strainer. The present application likewise relates to an axial turbine engine, in particular to an aeroplane turbojet engine or an aircraft turboprop engine. The present application further proposes a method of producing a strainer.

2. Description of Related Art

An aeroplane turbojet engine uses oil to perform a variety of functions. This oil may be used in order to work cylinders ensuring the movement of mechanisms within the turbojet engine. It likewise allows equipment within the turbojet engine, such as bearings and a gear assembly, to be lubricated. An oil circuit with conduits and pumps ensures the distribution and collection of oil in the turbojet engine. The circuit is provided with a heat exchanger to cool the oil before it lubricates the equipment, as the functioning of said equipment generates heat.

During operation, the equipment and mechanisms may be subject to wear and release particles into the oil circuit. These particles may likewise come from the outside environment. Their presence has a detrimental effect on the effective operation of the equipment and mechanisms. There is a danger of them causing premature wear and, in the worst case scenario, a malfunction. It is for this reason that the oil circuit is provided with a strainer, in order to intercept the particles and prevent them from becoming a danger.

Document US2008/0047888 A1 discloses a strainer for a pressurized oil circuit in a turbine engine. The strainer comprises a funnel-shaped filtering portion and a sleeve for holding the filtering portion. Said sleeve exhibits slots for the assembly thereof in the oil circuit in which the filtering portion intercepts debris. This design makes for simple manufacturing and easier installation in a corresponding seat. However, the strainer remains highly priced.

Although great strides have been made in the area of strainers for turbine engine oil, many shortcomings remain.

DETAILED DESCRIPTION OF THE PREFERRED EMBODIMENT

Figure 1:
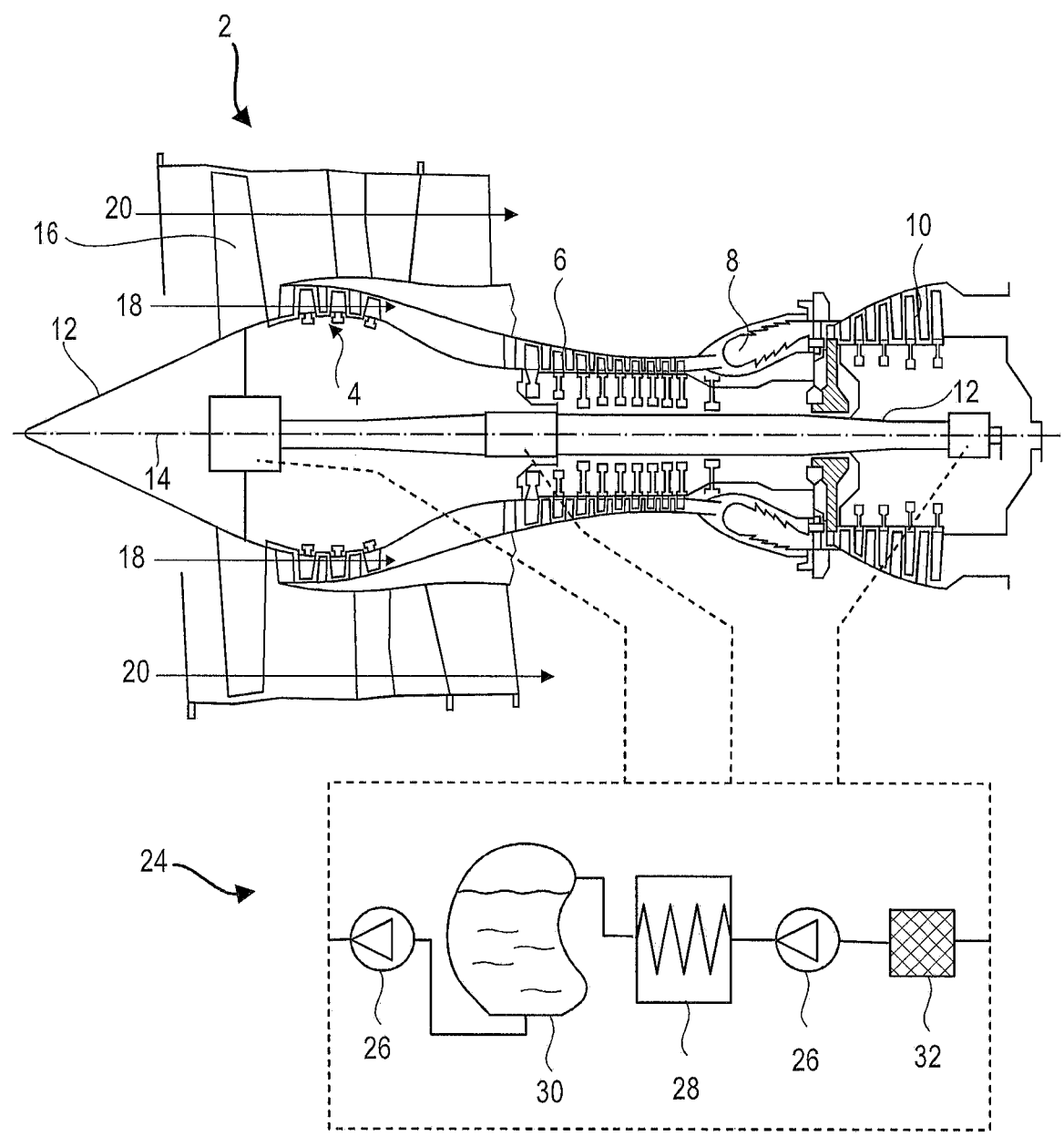
FIG. 1 shows a turbine engine with an oil circuit according to the present application.

The present application aims to solve at least one of the problems posed by the prior art. More precisely, the aim of the present application is to improve the reliability of a strainer. The present application discloses a turbine engine strainer, particularly for oil, the strainer comprising: a filtering portion intended to filter a fluid crossing it, said filtering portion possibly being curved; a structure for holding the filtering portion forming a thickening, notable in that the structure and the filtering portion are integral and are produced by additive manufacturing.

According to an advantageous embodiment of the present application, the strainer comprises a magnet housed in the structure, the magnet and the structure being made of different materials.

According to an advantageous embodiment of the present application, the filtering portion forms an angular tube portion and extends over most of the length of the strainer, the structure preferably delimiting each end of the filtering portion.

According to an advantageous embodiment of the present application, the structure exhibits at least one window grated by the filtering portion, preferably a plurality of windows grated by the filtering portion, which are superposed to extend the faces of the filtering portion.

According to an advantageous embodiment of the present application, the structure exhibits at least one holding post for the filtering portion, preferably at least two parallel posts.

According to an advantageous embodiment of the present application, the structure exhibits at least one holding ring for the filtering portion, preferably at least one ring encircles the filtering portion.

According to an advantageous embodiment of the present application, the or at least one or each ring forms a holding wall for the filtering portion, said wall being capable of partitioning the strainer.

According to an advantageous embodiment of the present application, the strainer is generally tubular and exhibits a main axis, the structure extending along the main axis over the entire length of the filtering portion, preferably over the entire length of the strainer.

According to an advantageous embodiment of the present application, the structure comprises a fixing base intended to be fixed to a support of the turbine engine, said base preferably forming one end of the strainer and forming an impervious plate.

According to an advantageous embodiment of the present application, the structure exhibits a socket with a housing parallel to the filtering portion, said housing preferably extending over substantially the entire length of the filtering portion.

According to an advantageous embodiment of the present application, the filtering portion comprises mesh with a width smaller than or equal to 800 μm and/or spaced at no more than 500 μm, preferably spaced at no more than 300 μm, more preferably spaced at no more than 200 μm.

According to an advantageous embodiment of the present application, the filtering portion exhibits at least one free face, preferably at least one portion of the filtering portion comprises two opposite free faces according to the thickness of said portion.

According to an advantageous embodiment of the present application, the structure comprises at least one perimeter groove, preferably a plurality of perimeter grooves spread over the strainer.

According to an advantageous embodiment of the present application, the structure and the filtering portion form a one-piece unit, the strainer possibly being one-piece.

According to an advantageous embodiment of the present application, at least one or each post extends over the entire length of the filtering portion.

According to an advantageous embodiment of the present application, the structure and the filtering portion delimit an internal space at least partially, said space preferably being cylindrical.

According to an advantageous embodiment of the present application, the housing of the socket is offset in respect of the filtering portion, preferably outside the filtering portion, more preferably completely outside the filtering portion.

According to an advantageous embodiment of the present application, the filtering portion comprises an internal face and an external face, said faces being free faces.

According to an advantageous embodiment of the present application, the magnet is enclosed in the socket housing.

According to an advantageous embodiment of the present application, the strainer exhibits a plurality of stages, possibly at least three stages, intended to protect at least three different lines of an oil circuit.

According to an advantageous embodiment of the present application, the filtering portion and the structure comprise at least one, preferably a plurality of, common curved edges and/or the filtering portion comprises a common adjoining edge with the window surrounding it.

The present application also discloses a strainer, particularly for oil, said strainer comprising: a curved filtering portion intended to filter a fluid, an assembly support forming an integral unit and supporting the filtering portion which possibly supports the curvature of the filtering portion, this being notable in that the support and the filtering portion are integral and possibly produced by additive manufacturing. The support may correspond to the structure referred to above.

The present application also discloses a turbine engine, in particular a multi-flow turbine engine, said turbine engine comprising a strainer, notable in that said strainer conforms to the present application, the turbine engine preferably comprises an oil circuit filtered by the strainer and/or bearings lubricated by oil from the oil circuit and/or hydraulic actuators capable of being driven by the oil pressure in the oil circuit and/or a gear assembly.

According to an advantageous embodiment of the present application, the oil circuit is a pressurized circuit comprising a pump, possibly downstream of the strainer, the circuit preferably comprises a lubrication assembly with an integral unit in which said pump and the strainer are disposed.

The present application also discloses a method of manufacturing a strainer, particularly for turbine engine oil, said strainer exhibiting a curved filtering portion for fluid filtration and a structure for holding the filtering portion forming a thickening, said method involving the linking together of the following stages: (a) design of a strainer model and (b) manufacture of the strainer according to the model devised during the design stage (a), notable in that the manufacturing stage (b) is an additive manufacturing stage of the strainer, wherein the filtering portion and the structure are produced simultaneously.

According to an advantageous embodiment of the present application, the method moreover comprises a chemical milling stage (c) of the strainer, particularly of the filtering portion, most of the milled surfaces of the strainer preferably being obtained by chemical milling.

According to an advantageous embodiment of the present application, the stacking of the layers is perpendicular to the filtration direction of the filtering portion.

According to an advantageous embodiment of the present application, the method comprises an assembly stage (e) of the battery by force-fitting it into the socket, the internal surface of the socket in contact with the magnet preferably being untreated.

As a general rule, the advantageous embodiments of the present application are likewise applicable to other embodiments of the present application. Insofar as it is possible, each embodiment of the present application can be combined with other embodiments.

The embodiment moreover allows freedom in geometric terms and simplifies the manufacture and assembly. The pressure losses in the flow through the strainer are better controlled; the energy required to drive the flow diminishes. The direct connection between the filtering portion and the structure means that gaps in which impurities would lodge can be avoided, making for easier maintenance and control.

The present type of strainer allows the filtering portion to be attached to the structure, ensuring material continuity and uniformity. The reliability is increased, thanks to the elimination of assembly stages and the elimination of mechanical interfaces, of contact surfaces. This likewise makes for easier assembly.

The present application moreover offers optimum mechanical resistance. The performance in response to vibrations inherent in a turbine engine is improved further. This advantage is guaranteed, despite the operating pressure applied to the strainer.

FIG. 1 shows a simplified representation of an axial turbine engine. In this particular case, it is a double-flow turbojet engine. The turbojet engine 2 comprises a first compression level referred to as a low-pressure compressor 4, a second compression level referred to as a high-pressure compressor 6, a combustion chamber 8 and one or several turbine levels 10. During operation, the mechanical power of the turbine 10 transmitted via the central shaft to the rotor 12 sets the two compressors 4 and 6 in motion. Said compressors comprise a plurality of rows of rotor blades associated with rows of stator blades. The rotation of the rotor about its axis of rotation 14 therefore allows an output of air to be generated and said air to be progressively compressed until it enters the combustion chamber 8. Multiplication means may increase the rotational speed transmitted to the compressors.

An input fan commonly referred to as a fan or blower 16 is coupled to the rotor 12 and generates an air flow which is divided into a primary flow 18 crossing the different levels of the turbine engine referred to above and a secondary flow 20 crossing an annular conduit (partially shown) along the engine before it then rejoins the primary flow at the turbine outlet. The secondary flow may be accelerated in such a manner as to generate a thrust reaction allowing the associated aeroplane to fly.

The turbine engine 2 comprises a pressurized oil circuit 24. This oil lubricates and cools the bearings. These bearings allow the low-pressure shaft, the high-pressure shaft and the fan shaft to be articulated. The oil may, in particular, be used in the blower gear mechanism. It likewise finds an application in hydraulic actuators, thanks to its pressure.

The circuit may likewise include one or more pumps 26, possibly gerotor pumps, to drain back or carry or aspirate the oil in lubrication chambers. The oil circulates in a heat exchanger 28 in a tank 30. Different, possibly independent, lines may allow the mechanisms to be lubricated independently. To this end, the circuit 24 may form a plurality of loops. It is clear that the circuit may follow any pattern emanating from the needs of the turbine engine 2.

In order to keep the oil clean, the circuit 24 is equipped with one or a plurality of strainers 32. A strainer 32 may be provided in a tank 30 and/or in a conduit between two mechanisms and/or in the very heart of a mechanism of the turbine engine 2. The strainer 32 may be housed in a lubrication assembly likewise receiving pumps 26, downstream of the pumps 26, for example. The strainer 32 may be arranged in tiers, so that a single piece allows the filtration of a plurality of lines. Handling, control and maintenance become simpler.

Figure 2:
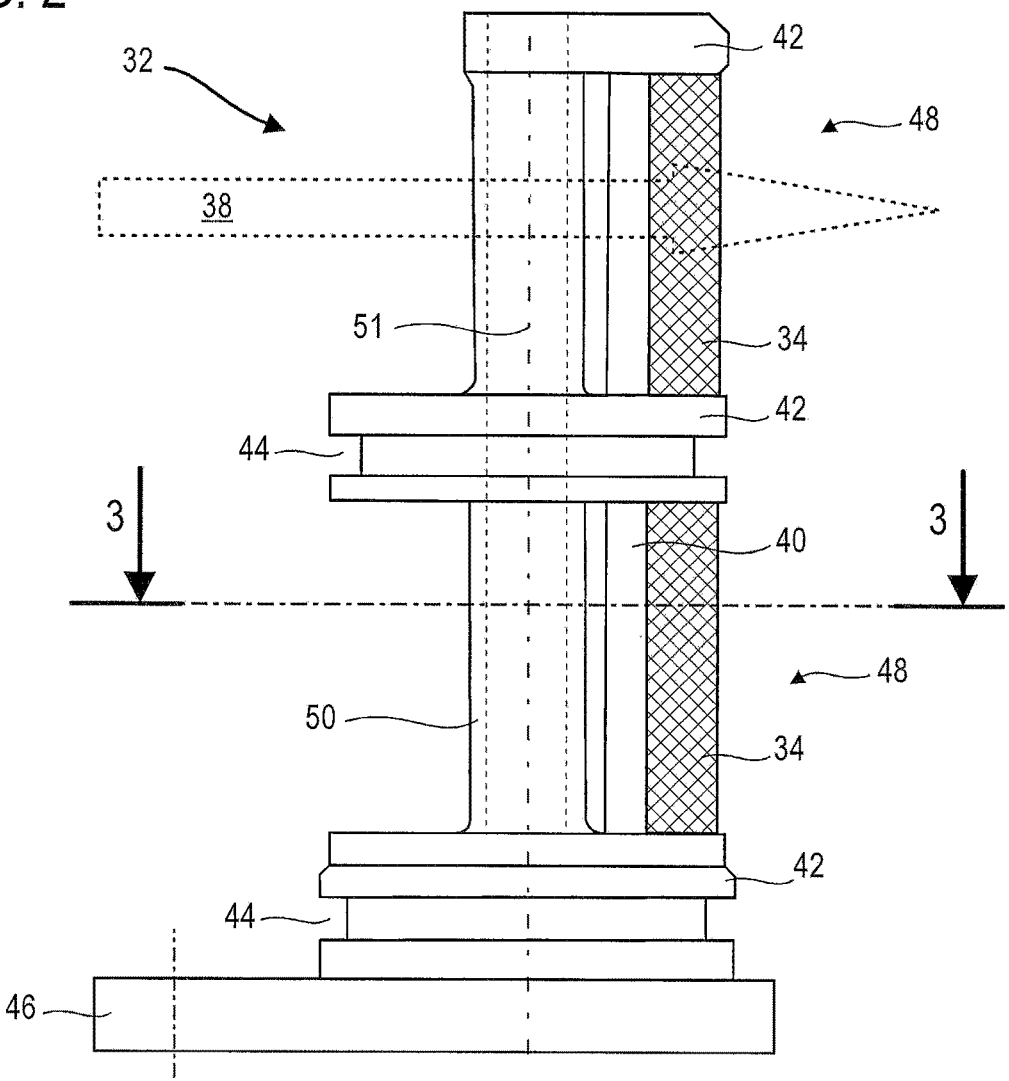
FIG. 2 illustrates a strainer according to a first embodiment of the present application.

FIG. 2 shows a strainer 32 according to a first embodiment of the present application, in this case a two-stage strainer 32. It is possible to envisage three or more stages. The present strainer 32 has a radial flow; however the present application likewise lends itself to a strainer with axial flow.

The strainer 32 may be metal. The strainer 32 comprises a filtering portion 34 forming a sheet and a holding structure 36 of the filtering portion. The filtering portion 34 generally exhibits a pup joint shape and delimits a cylindrical internal space crossed radially by the oil flow 38 to be filtered. It may be a circular arc; it may exhibit a constant curvature.

The filtering portion 34 extends over most of the length of the strainer 32, the structure 36 preferably delimiting each end of the filtering portion 34. The length in this case is perpendicular to the flow direction 38 and/or perpendicular to the radial direction. The filtering portion 34 forms a grille, a screen which prevents debris greater than 800 μm from passing through, thanks to its mesh. However, it may be configured in such a manner as to block very fine particles. Its passing mesh size may therefore be smaller than 0.80 mm. Their diagonals may be smaller than or equal to 1.20 mm. The mesh may be square and delimited by rods with widths of less than 0.30 mm.

The filtering portion 34 partially forms the skin of the strainer 32, over most of its surface, for example. The faces of the filtering portion 34 are free, in order to intercept debris directly and to limit the loss of pressure. This also tends to simplify the strainer 32, to simplify its manufacture while preserving its reliability.

The structure 36 forms a framework which runs across, surrounds, the extent of the filtering portion 34, allowing it to retain its shape. To this end, the structure 36 exhibits a plurality of axial posts 40 extending along the axis of the strainer 32. These posts 40 are intersected by holding rings 42 of the filtering portion 34. The rings 42 may exhibit perimeter grooves 44 so that an O-ring seal (not shown) can be fitted there. These rings 42 form walls to partition the strainer 32, so that it exhibits leak-proof stages. The walls can comprise a lower wall formed by a lower rings, an intermediate wall formed by an intermediate ring and an upper wall formed by an upper ring.

The structure 36 may comprise a fixing base 46 for assembly of the strainer 32 on a support, for example the body of the lubrication assembly. The base 46 may form one end of the strainer. The lower ring 42 and/or the base 46 exhibit(s) a thickening in relation to the mesh that forms the filtering portion 34. It may comprise a local thickening, so that a clean groove can be made there, for example.

The posts 40 may extend from the base 40. The structure 36 may exhibit grated windows 48 with the filtering portion 34. In particular, the superposed windows 48 may be delimited by the rings 42 and the posts 40. The filtering portion 34 may likewise join the rings 42 one to the other and the posts 40 one to the other. The posts 40 and rings 42 may also intersect the filtering portion 34, dividing it up into a plurality of parcels or portions, possibly belonging to a window 48. The filtering portion 34 or each of its portions exhibits an adjoining edge which is common to the window 48 which surrounds it, and therefore common to the posts 40 and to the rings 42 which delimit it. One edge exhibits a curved zone to allow the filtering portion 34 to retain its curvature.

The structure 36 may form at least one socket 50. Said socket delimits a housing adjoining the filtering portion 34. It extends along the main axis 51 of the strainer, the main axis 51 being the longest in terms of height and/or extension. The housing may extend over substantially the entire length of the filtering portion 34. The socket 50 may be a post. The strainer may comprise a magnet which is housed, preferably completely enclosed, in the structure 36. The magnet may be a permanent magnet. It may be formed from a plurality of segments introduced into the socket, then locked with the help of a resin or a flexible clip. The magnet traps the metallic debris, an analysis of said debris allowing the degree of wear to the mechanisms from which it originates to be assessed.

The structure 36 and the filtering portion 34 are integral and are produced by additive manufacturing based on powdered aluminium, titanium, steel, alloys thereof, or any other kind of suitable material. The filtering portion 34, the posts 40, the rings 42, the walls, the socket 50 may therefore be integral and realized by additive manufacturing. The magnet is made of another material.

Figure 3:
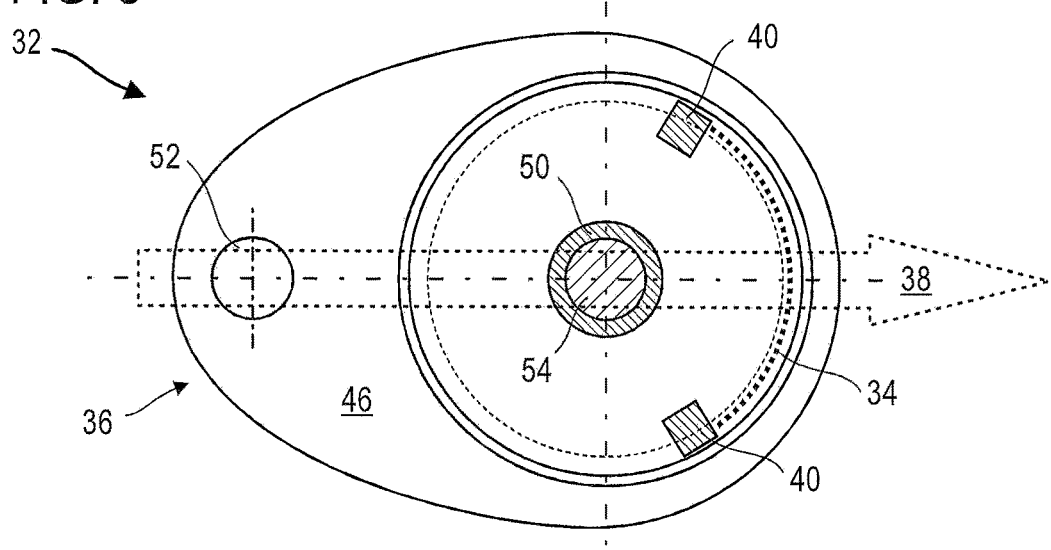
FIG. 3 is a section through the strainer according to the first embodiment of the present application along the axis 3-3 drawn in FIG. 2.

FIG. 3 shows a section through the strainer 32. This section is made along the axis 3-3 depicted in FIG. 2. It may be an additive manufacturing layer.

The section crosses the structure 36 and the strainer 34. The posts 40, the socket 50 and the magnets 54 are intersected here. The base 46 appears at the bottom with its through-hole 52 which allows the strainer 32 to be fixed. The filtering portion 34 may form a tube or an angular tube fraction. It may generally form a half-tube. It may run through at least a fifth turn, preferably at least a quarter turn, more preferably at least a third turn. The curved aspect increases the specific filtration surface of the filtering portion 34, while at the same time allowing a certain rigidity.

The strainer 32 is generally tubular; a portion of the tube surface is formed by the filtering portion 34. The structure 36 reproduces this shape, enabling a bore of the lubrication assembly to be leak-proof. The profile as a fraction of a circle of the filtering portion is optimal for a cylindrical housing.

The socket 50 may be in the central position of the tube in order to intercept ferromagnetic particles in the flow 38, namely upstream of the filtering portion 34 to avoid obstructing it. It is configured to guarantee the rigidity of the structure 36, to allow the posts 40 to be kept straight and to preserve the gap between the rings 42. The posts 40 may occupy lateral positions, in order to keep the filtering portion 34 in its curvature, something that is likewise realized by the rings 42.

Figure 4:
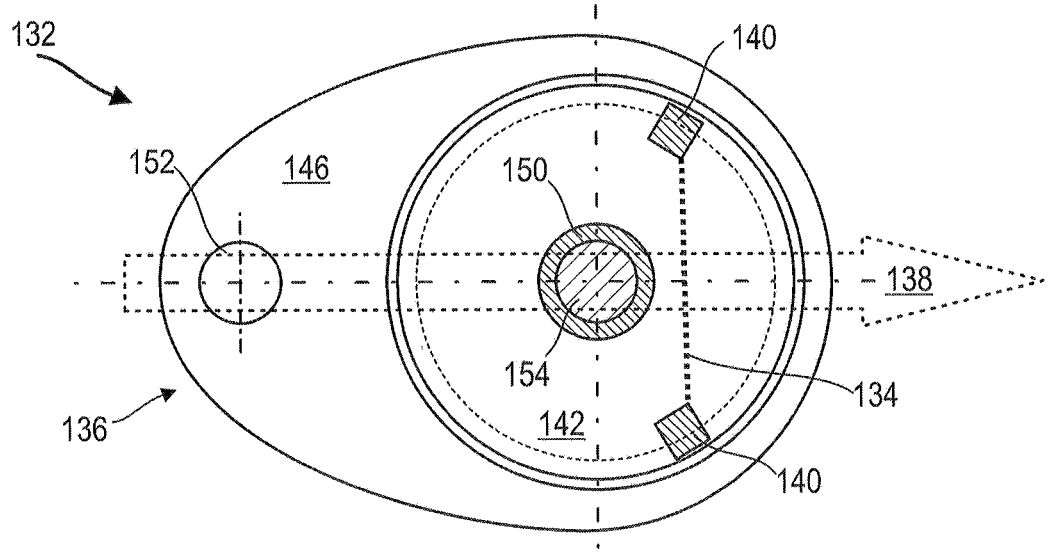
FIG. 4 is a section through the strainer according to a second embodiment of the present application along the axis 3-3 drawn in FIG. 2.

FIG. 4 shows a section through the strainer 132 according to a second embodiment of the present application. This section is made along the axis 3-3 shown in FIG. 2. It may be an additive manufacturing layer. The system of numbering is the same as that used in the preceding figures for similar or identical elements, except that the system of numbering is increased by 100.

The strainer 132 according to the second embodiment is substantially identical to the strainer according to the first embodiment, although it differs therefrom in that its filtering portion 134 is flat. The section crosses the structure 136 and the filtering portion 134. The posts 140, the socket 150 and the magnets 154 are intersected in this case. The base 146 appears at the bottom with its through-hole 152 which allows the strainer 132 to be fixed.

The filtering portion 134 extends in a straight line from one post 140 to the other. It forms a plane perpendicular to the base 146. The filtering portion 134 may extend parallel to the magnets 154 and to the socket 150; it may particularly remain distal from the socket 150. The filtering portion 134 may form a curtain between the rings 142.

The socket 150 may be in a central position of the tube in order to intercept ferromagnetic particles, namely upstream of the filtering portion 134 to avoid obstructing it. It is configured to guarantee the rigidity of the structure 136, to allow the posts 140 to be kept straight and to preserve the gap between the rings 142. The posts 140 may occupy lateral positions, in order to keep the filtering portion 134 flat, something that is likewise realized by the rings 142.

Figure 5:
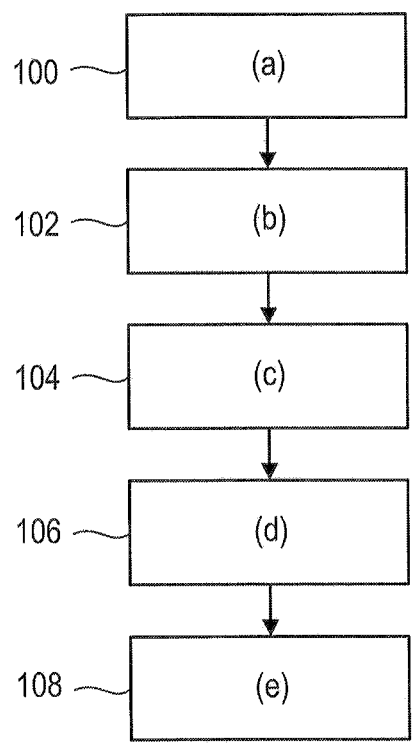
FIG. 5 is a diagram of a method of producing a strainer according to the present application.

FIG. 5 shows a diagram of the method of manufacturing a strainer. The strainer may correspond to that described in relation to FIGS. 2 to 4.

The method may involve the linking together of the following stages in the following order:
(a) design 100 of a strainer model;
(b) additive manufacturing 102 of the strainer according to the model devised during the design stage (a) with the structure and the filtering portion being produced simultaneously;
(c) chemical milling 104 of the strainer;
(d) mechanical milling 106 of the base, for example;
(e) mounting 108 of the magnet, which is optional as the presence of the magnet remains discretionary.

The design stage (a) 100 allows a numerical model to be created by computer-aided design. The theoretical model allows particles of a predetermined size, for example measuring 800 μm, to be filtered. The theoretical strainer likewise allows a theoretical pressure loss lower than or equal to a predefined threshold to be observed.

The manufacturing stage (b) 102 is an additive manufacturing stage with superposed layers, this likewise being referred to as 3D printing. A method of this kind is well known to the person skilled in the art and can be recognized in the case of the strainer by cutting through a sample of its material. The method may involve the use of powder, particularly a metallic powder, with this being fused locally. A filler material in strand form can be envisaged. The layers may be less than 1.00 mm, preferably less than 0.50 mm, more preferably less than 0.050 mm thick. The fineness of the layers allows an intersection to be created of the finest filtering portion axes, which moreover allows mesh to be produced on a given surface. In this way, the pressure loss is reduced. During the course of this process, a plurality of material layers are solidified one after the other. A plurality of layers forms the structure and the filtering portion at the same time. A plurality of layers may possibly form the socket, the posts and the filtering portion at the same time.

The chemical milling stage (c) 104 may allow improvement of the surface state of the untreated strainer, in other words the surface following additive manufacturing. It can treat most of the machined surfaces of the strainer which are machined, including the filtering portion. This stage (c) increases the size of the raw mesh by refining the shafts of the untreated filtering portion from the additive manufacturing process. Refining allows the fineness that can be achieved by additive manufacturing, particularly powder-based, possibly by electron beams or by laser, to be surpassed.

The mechanical treatment stage (d) 106 may be realized by turning, by milling. However, this stage remains optional according to the present application, just as the chemical milling. In effect, one or these two stages may be suppressed, as one of the milling treatments or the additive manufacturing may allow satisfactory functional surfaces to be realized according to requirements. The order in which the milling stages (c) and (d) are carried out may be reversed.

The characteristics exhibited in relation to the method may be applied to the product and vice versa.

We claim:

1. A turbine engine strainer, comprising:
an axis;
a single filtering portion having a shape of an angular portion of a cylinder extending angularly of less than 180 degrees around the axis and configured to filter a fluid; and
a structure for holding the filtering portion, the structure comprising:
a fixing base with a lower ring;
a holding disc partitioning the strainer; and
an upper wall;
wherein the fixing base, the lower ring, the holding disc and the upper wall each prevent fluid from flowing parallel to the axis, and
wherein the structure and the filtering portion are integral and are produced by additive manufacturing.

2. The turbine engine strainer of claim 1, further comprising:
a magnet housed in the structure, the magnet and the structure being made of different materials.

3. The turbine engine strainer of claim 1, wherein the structure comprises:
at least one window grated by the single filtering portion.

4. The turbine engine strainer of claim 1, wherein the structure comprises:
exactly two parallel posts for holding the single filtering portion, the posts extending from the fixing base to the upper wall,
wherein the filtering portion extends angularly from one of the two axial posts to the other of the two axial posts, and not beyond.

5. The turbine engine strainer of claim 1, wherein the holding disc partitions the filtering portion into two parts, of which one part extends from the lower ring to the holding disc and the other part extends from the holding disc to the upper wall.

6. The turbine engine strainer of claim 1, wherein the fixing base is configured to be fixed to a support of a turbine engine, the fixing base forming one end of the strainer and forming an impervious plate.

7. The turbine engine strainer of claim 1, wherein the structure comprises:
a socket with a housing parallel to the single filtering portion.

8. The turbine engine strainer of claim 1, wherein the filtering portion comprises:
a mesh with a pore width of at most 800 μm.

9. The turbine engine strainer of claim 1, wherein the structure comprises:
a plurality of perimeter grooves spread over the strainer.

* * * * *